F. A. Leonhard. Combined Cotton Chopper, Scraper and Cultivator.
No. 118,951. Patented Sep. 12, 1871.
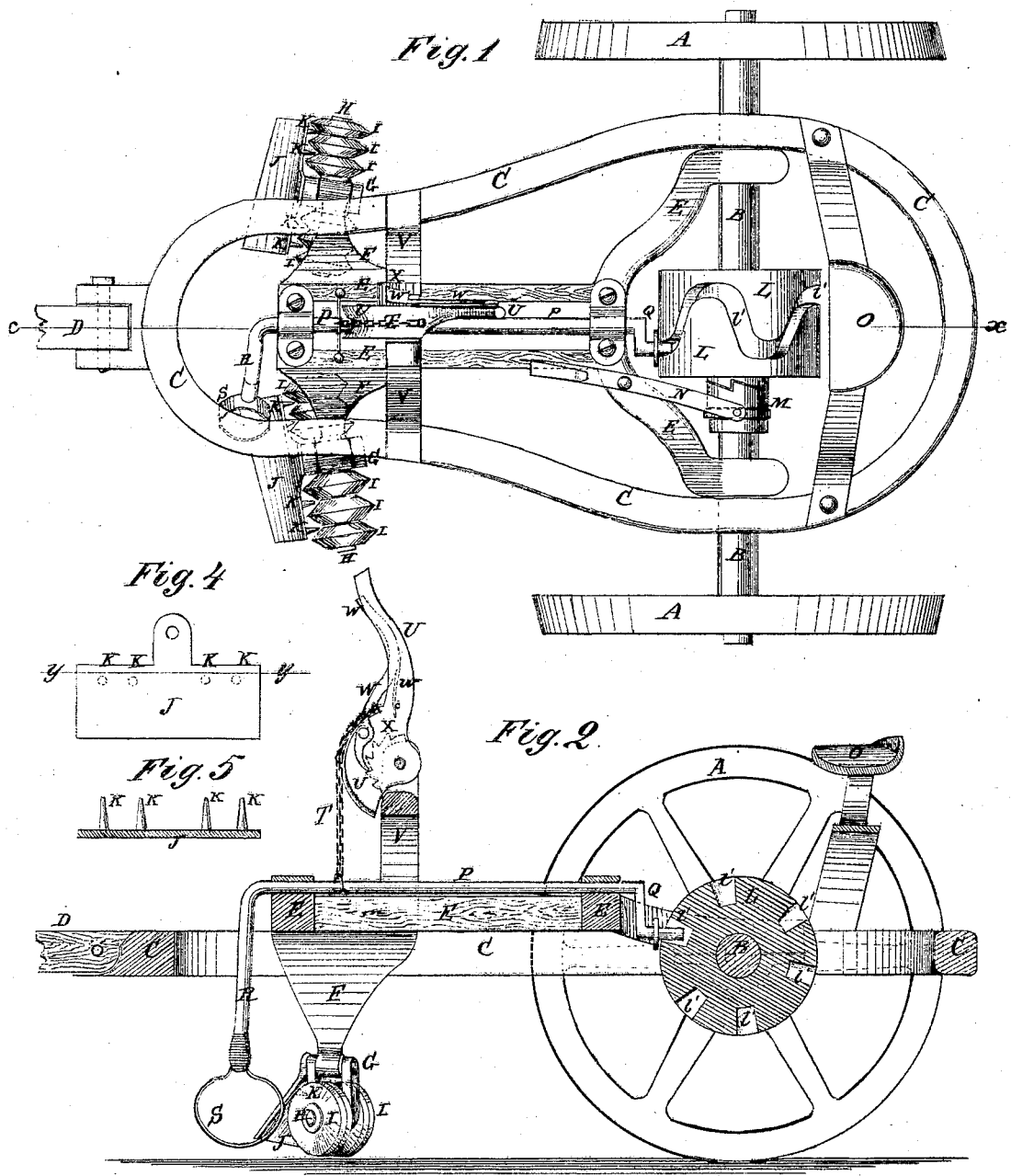
Witnesses:
A. W. Almqvist
Wm. H. C. Smith
Inventor:
F. A. Leonhard
per
Attorneys.

UNITED STATES PATENT OFFICE.

FRANK A. LEONHARD, OF COLUMBIA, TENNESSEE.

IMPROVEMENT IN COTTON-CHOPPERS, SCRAPERS, AND CULTIVATORS.

Specification forming part of Letters Patent No. 118,951, dated September 12, 1871.

*To all whom it may concern:*

Be it known that I, FRANK A. LEONHARD, of Columbia, in the county of Maury and State of Tennessee, have invented a new and useful Improvement in Combined Cotton-Chopper, Scraper, and Cultivator; and I do hereby declare that the following is a full, clear, and exact description thereof, which will enable others skilled in the art to make and use the same, reference being had to the accompanying drawing forming part of this specification, in which—

Figure 1 is a top view of my improved machine. Fig. 2 is a detail vertical section of the same taken through the line $x$ $x$, Fig. 1. Fig. 3 is a detail view of one set of the cultivating and supporting-rollers. Fig. 4 is a detail front view of one of the scrapers. Fig. 5 is a detail section of the same taken through the line $y$ $y$, Fig. 4, and showing the teeth for cleaning the rollers.

Similar letters of reference indicate corresponding parts.

My invention has for its object to furnish a simple, convenient, and effective machine for chopping, scraping, and cultivating cotton, which shall be so constructed that the supporting and cultivating-rollers, while supporting the chopper at the proper elevation, shall be capable of adjusting themselves to any unevenness of the ground laterally; and it consists in the construction and arrangement of certain parts of the machine, as hereinafter more fully described.

A are the wheels, which are keyed to or otherwise rigidly connected with the ends of the axle or shaft B, so as to carry the said shaft or axle with them in their revolution. C is an iron frame, the rear part of which is connected with the axle B by journal-boxes or bearings, so as to be supported by said axle. To the forward end of the frame C is attached the tongue D, so that the forward end of the said frame C may be supported by the said tongue D. E is a frame placed within the forward part of the frame C. The rear end of the frame E is made branched or forked, and the rear ends of the said branches or forks are connected with the axle B by journal-boxes or bearings, so that the rear end of the said frame E may ride upon and be supported by the said axle B. To the sides of the forward ends of the frame E are attached the upper ends of two arms, F, which project downward and outward, and to the lower end of each is pivoted a coupling, G, in such a way as to have a free lateral movement—that is to say, a free movement in a direction at right angles with the path of the machine. Through the lower part of the couplings G is passed, in an inclined direction, as shown in Fig. 1, a rod, H, upon which is placed and secured, in such a way as to revolve freely and independently of each other, a series of rollers, I, the faces of which are made sharp or V-shaped, so as to penetrate and cultivate the ground upon each side of the row of plants, the inclination of the rods H causing the rollers I to act as a screw in giving a lateral movement to the soil. The rollers I may be made to move the soil toward or from the plants by placing them upon one or the other of the arms F. The joint of the couplings G enables the rollers I to adjust themselves to any lateral unevenness or inclination of the ground. To the forward sides of the couplings G are attached the scrapers J, which are thus adjusted to the ground by the self-adjustment of the rollers I. With the rear side of the scrapers J are connected teeth K, which pass in between the edges of the rollers I and remove any soil that may adhere to them. L is a cylinder having a cam or zigzag groove, $c'$, formed in its face. The cylinder L is placed and runs loosely upon the middle part of the axle B, which axle is made to carry said cylinder with it in its revolution by a clutch, M, which slides upon the said axle, and is moved toward and from the cylinder L by a lever, N, pivoted to the frame E in such a position that it may be operated by the driver from his seat O with his foot. The seat O is supported from the rear part of the frame C, as shown in Figs. 1 and 2. P is a shaft which revolves in bearings in the rear and front parts of the frame E.

To the rear end of the shaft P is attached, or upon it is formed, a crank, Q, the crank-arm of which has a friction-roller placed upon it, and enters the cam-groove $l'$ of the cylinder L, so that the shaft P may be rocked by the revolution of the said cylinder L. The forward end of the shaft P is bent downward, or has a downwardly-projecting arm, R, attached to it. To the lower end of the arm R is adjustably attached the chopper S, which is thus oscillated laterally as the machine is drawn forward, chopping the cotton at regular intervals. To the forward end of the frame E is attached the lower end of the chain T, which passes over the cam of the lever U, and its upper end is attached to said lever U, so that by operating the said lever the forward end of the frame E may be raised, raising the rollers I, scrapers J, and chopper S away from the ground, for convenience in turning, avoiding obstructions, and passing from place to place. The lever U is pivoted to a curved or arched bar or bracket, V, the ends of which are attached to the side bars of the frame C. The lever U is held in any position into which it may be adjusted by the lever-pawl W, which takes hold of the ratchet-teeth X formed upon one of the lugs of the bracket V, to which the cam-lever U is pivoted. The lever-pawl W is held against the teeth X by a spring, $w'$.

Having thus described my invention, I claim as new and desire to secure by Letters Patent—

1. The arrangement of the rollers I and scraper J, in connection with the arms F, whereby they are adapted to oscillate, as shown and described.

2. The arrangement of the two sets of rollers I and scrapers J and the vibrating chopper S, in connection with the pivoted frame E, as shown and described.

FRANK A. LEONHARD.

Witnesses:
H. L. HOLMAN,
L. M. MATTHEWS.